United States Patent
Vittorias et al.

(10) Patent No.: US 9,580,583 B2
(45) Date of Patent: *Feb. 28, 2017

(54) POLYETHYLENE COMPOSITION HAVING HIGH SWELL RATIO

(71) Applicant: Basell Polyolefine GmbH, Wesseling (DE)

(72) Inventors: Iakovos Vittorias, Mainz (DE); Jens Wiesecke, Zwingenberg (DE); Bernd Lothar Marczinke, Frankfurt (DE); Gerhardus Meier, Frankfurt (DE); Ulf Schüller, Weiterstadt (DE); Volker Dolle, Bensheim (DE); Johannes-Friedrich Enderle, Frankfurt (DE); Dieter Lilge, Limburgerhof (DE); Barbara Gall, Günzburg (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,417

(22) Filed: Jul. 20, 2016

(65) Prior Publication Data

US 2016/0326354 A1    Nov. 10, 2016

Related U.S. Application Data

(63) Continuation of application No. 14/437,783, filed as application No. PCT/EP2013/072000 on Oct. 22, 2013, now Pat. No. 9,428,623.

(60) Provisional application No. 61/730,925, filed on Nov. 28, 2012.

(30) Foreign Application Priority Data

Oct. 22, 2012  (EP) ..................................... 12189392
Nov. 28, 2012  (EP) ..................................... 12194530

(51) Int. Cl.
| | |
|---|---|
| C08L 23/06 | (2006.01) |
| C08L 23/08 | (2006.01) |
| C08F 210/16 | (2006.01) |
| C08J 5/00 | (2006.01) |
| B29C 47/00 | (2006.01) |
| B29C 49/04 | (2006.01) |
| B29C 47/92 | (2006.01) |
| C08F 2/34 | (2006.01) |
| B01J 8/18 | (2006.01) |

(52) U.S. Cl.
CPC .......... *C08L 23/06* (2013.01); *B29C 47/0004* (2013.01); *B29C 47/92* (2013.01); *B29C 49/04* (2013.01); *C08F 210/16* (2013.01); *C08J 5/00* (2013.01); *C08L 23/0815* (2013.01); *C08J 2323/06* (2013.01); *C08J 2323/08* (2013.01); *C08J 2423/08* (2013.01); *C08L 2205/025* (2013.01); *C08L 2308/00* (2013.01)

(58) Field of Classification Search
CPC ........ C08F 2/001; C08F 210/16; C08L 23/06; C08L 23/08; C08J 5/00
USPC .......................................................... 526/65
See application file for complete search history.

(56) References Cited

U.S. PATENT DOCUMENTS

| | | | |
|---|---|---|---|
| 6,201,078 B1 * | 3/2001 | Breulet | C08F 10/00 525/240 |
| 6,417,301 B1 | 7/2002 | Ford et al. | |
| 9,023,945 B2 * | 5/2015 | Mavridis | C08L 23/08 525/240 |
| 9,353,206 B2 * | 5/2016 | Vittorias | C08L 23/0815 |
| 2007/0093621 A1 | 4/2007 | Meier et al. | |
| 2010/0029869 A1 | 2/2010 | Morini et al. | |
| 2015/0267010 A1 * | 9/2015 | Vittorias | C08L 23/0815 526/226 |
| 2016/0152747 A1 * | 6/2016 | Meier | C08L 23/0815 526/124.2 |
| 2016/0152853 A1 * | 6/2016 | Meier | C08L 23/06 428/35.8 |

FOREIGN PATENT DOCUMENTS

| | | | | |
|---|---|---|---|---|
| JP | 2010513625 A | 4/2010 | | |
| JP | 2011017030 A | 1/2011 | | |
| WO | WO 2005/019280 A1 * | 3/2005 | ................ | C08F 2/38 |

OTHER PUBLICATIONS

PCT International Search Report & Written Opinion mailed Dec. 18, 2013 for PCT/EP2013/072000.

* cited by examiner

*Primary Examiner* — Fred M Teskin

(57) ABSTRACT

The present disclosure relates to a polyethylene composition with improved swell ratio and mechanical properties for use in preparing blow-moulded articles and having the following features:
1) a density from 0.945 to less than 0.952 g/cm$^3$;
2) an MIF/MIP ratio from 15 to 30;
3) a Shear-Induced Crystallization Index (SIC) from 2.5 to 5.5.

9 Claims, 1 Drawing Sheet

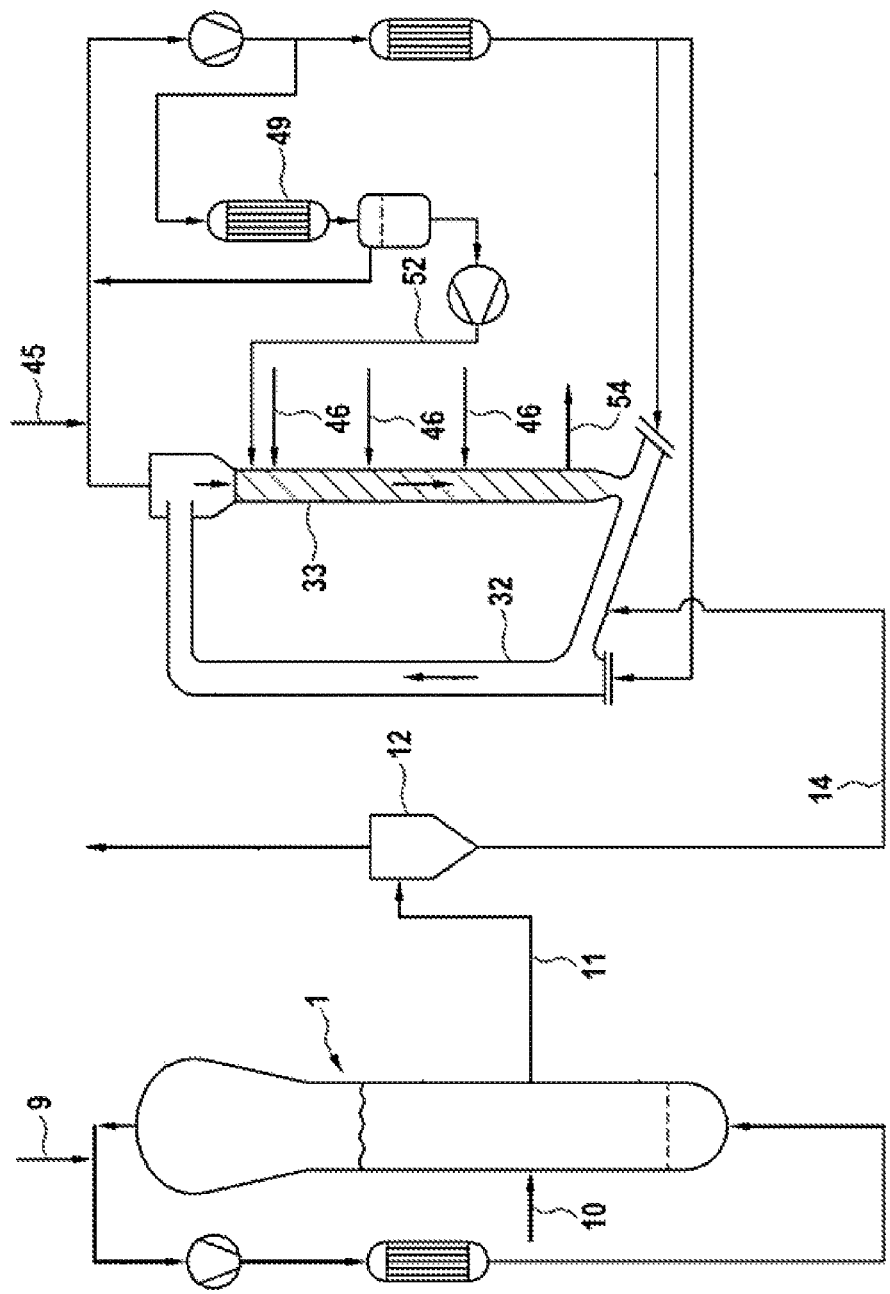

POLYETHYLENE COMPOSITION HAVING HIGH SWELL RATIO

CROSS-REFERENCE TO RELATED APPLICATIONS

This application is a Continuation Application of U.S. patent application Ser. No. 14/437,783, filed Apr. 22, 2015, now patented as U.S. Pat. No. 9,428,623 on Aug. 30, 2016, which is the U.S. National Phase Application of PCT International Application PCT/EP2013/072000, filed Oct. 22, 2013, claiming benefit of priority to European Patent Application No. 12189392.9, filed Oct. 22, 2012, European Patent Application No. 12194530.7, filed Nov. 28, 2012, and claiming benefit of priority under 35 U.S.C. §119(e) of U.S. Provisional Application No. 61/730,925, filed Nov. 28, 2012, the contents of which are incorporated herein by reference in their entirety.

FIELD OF THE INVENTION

The present disclosure provides a polyethylene composition suitable for preparing various kinds of formed articles. In some embodiments, due to its enhanced processability, high die-swell with high-quality surface and dimension stability of final article, environmental stress cracking resistance (FNCT) and impact resistance, the present composition is suitable for making extrusion blow-molded hollow articles, such as drums, containers and gasoline storage tanks.

The present disclosure also relates to a multi-stage polymerization process for preparing the polyethylene composition.

BACKGROUND OF THE INVENTION

An additional and important advantage of the polyethylene composition of the present disclosure is that it can be melt-processed at unusually high shear rate values, which mean high processing speeds and/or reduced melt-processing temperatures, without encountering flow-instabilities that generally produce unacceptable defects in the resulting formed articles (e.g. shark skin or melt-fracture aspects), even in the absence of processing aids.

Moreover, the fast crystallization kinetics of the present composition, which provides a critical contribution to its superior processability, also provides an unusually reduced shrinkage in the resulting formed articles, thus allowing for a remarkable dimensional stability.

The composition of the present disclosure provides an unmatched balance of mechanical properties and processability with respect to many known polyethylene compositions for the same use, as disclosed in U.S. Pat. No. 6,201,078.

In this regard, the polymers disclosed in U.S. Pat. No. 6,201,078 achieve a relatively low balance of swell ratio and environmental stress cracking resistance, as shown in the examples therein.

The problems associated with high impact resistance, reducing the flow-instabilities and improving the dimensional stability (lowering shrinkage) are not overcome in the above referenced patent.

SUMMARY OF THE INVENTION

In some embodiments, the present disclosure provides a polyethylene composition comprising:
1) a density from 0.945 to less than 0.952 g/cm³, such as from 0.948 to 0.951 g/cm³, as determined according to ISO 1183 at 23° C.;
2) a MIF/MIP ratio from 15 to 30, including from 17 to 29, where MIF is the melt flow index at 190° C. with a load of 21.60 kg, and MIP is the melt flow index at 190° C. with a load of 5 kg, both determined according to ISO 1133;
3) an SIC Index from 2.5 to 5.5, such as from 2.5 to 4.5, including from 3.2 to 3.9;

wherein the SIC Index is the Shear-Induced Crystallization Index, determined according to the following relation:

$$\text{SIC Index} = (t_{onset,SIC}@1000 \times t_{onset,\,quiescent}) / ((\text{HLMI})^*100)$$

where $t_{onset,SIC}@1000$ is measured in seconds and is the time required for a crystallization onset under a shear rate of 1000 S$^{-1}$, the $t_{onset,\,quiescent}$ is measured seconds and is the crystallization onset time at a temperature of 125° C. under no shear, as determined in isothermal mode by differential scanning calorimetry (DSC); and HLMI is the melt flow index determined at 190° C. with a load of 21.6 kg, according to ISO 1133.

BRIEF DESCRIPTION OF THE DRAWINGS

These and other features, aspects, and advantages of the present disclosure will become better understood with reference to the following description and appended claims, and accompanying drawing FIGURE where:

The drawing is an illustrative embodiment of a simplified process-flow diagram of two serially connected gas-phase reactors suitable for use in accordance with various embodiments of ethylene polymerization processes disclosed herein to produce various embodiments of the polyethylene compositions disclosed herein.

It should be understood that the various embodiments are not limited to the arrangements and instrumentality shown in the drawing FIGURE.

DETAILED DESCRIPTION OF THE INVENTION

The expression "polyethylene composition" is intended to embrace, as alternatives, both a single ethylene polymer and an ethylene polymer composition, such as a composition of two or more ethylene polymer components, including components with different molecular weights, such compositions being called "bimodal" or "multimodal" polymers in the relevant art.

In some embodiments, the polyethylene composition of the present disclosure consists of or comprises one or more ethylene copolymers.

All the features described herein, comprising the features 1) to 3) described above, refer to the ethylene polymer or ethylene polymer composition. The addition of other components, such as additives described in the relevantart, can be employed to modify one or more of the features described herein.

The MIF/MIP ratio provides a rheological measure of molecular weight distribution.

Another measure of the molecular weight distribution is provided by the ratio Mw/Mn, where Mw is the weight average molar mass and Mn is the average molar mass, both measured by GPC (Gel Permeation Chromatography), as explained in the examples.

In some embodiments, Mw/Mn values for the polyethylene composition of the present disclosure range from 20 to 30.

Moreover, in certain embodiments the polyethylene composition of the present disclosure has at least one of the following additional features:
- an Mw equal to or greater than 250,000 g/mol, such as equal to or greater than 280,000 g/mol, including equal to or greater than 300,000 g/mol;
- a Long Chain Branching index (LCB) determined, as described in the examples, equal to or greater than 0.70, including equal to or greater than 0.72, and equal to or greater than 0.80;
- an MIP of 0.05-0.5 g/10 min;
- an MIF of 1-15 g/10 min; and
- a comonomer content equal to or less than 1% by weight, including from 0.05 to 1% by weight, with respect to the total weight of the composition.

The comonomer or comonomers present in the ethylene copolymers may be selected from olefins having the formula $CH_2=CHR$, wherein R is an alkyl radical, linear or branched, having from 1 to 10 carbon atoms.

Specific examples are propylene, butene-1, pentene-1, 4-methylpentene-1, hexene-1, octene-1 and decene-1.

In some embodiments, the present composition comprises:
A) 30-50% by weight of an ethylene homopolymer or copolymer with a density equal to or greater than 0.960 g/cm³ and melt flow index (MIE) at 190° C. with a load of 2.16 kg, according to ISO 1133, of 10-35 g/10 min; and
B) 50-70% by weight of an ethylene copolymer having a MIE value lower than the MIE value of A), such as lower than 0.5 g/10 min.

The above referenced percent amounts are given with respect to the total weight of A)+B).

The amount of comonomer in B) is, in certain embodiments, from 0.1 to 2% by weight with respect to the total weight of B).

The present polyethylene composition can be advantageously used in the preparation of extrusion blow-molded hollow articles, including large blow-molded articles such as open-top-drums (OTD) and industrial-bulk-containers (IBC), owing to its valuable mechanical properties.

The composition of the present disclosure may, in some embodiments, be characterized by the following properties:
- a FNCT equal to or greater than 10 hours, such as equal to or greater than 100 hours and equal to or greater than 150 hours, as measured at 4 MPa and 80° C.;
- a notch tensile impact (−30° C.) equal to or greater than 100 kJ/m²;
- a critical shear-rate for shark skin (190° C.) equal to or greater than 250 s$^{-1}$;
- a die swell-ratio equal to or greater than 150%;
- a shrinkage at 1500 s$^{-1}$ (190° C.) equal to or less than 17%.

The details of the test methods are given in the examples.

In some embodiments, the shark skin test (particularly, the critical shear rate for shark skin) provides an indication of the shear rate at which flow instabilities start to appear due to pressure oscillations and the melt processing conditions, and consequently of the extrusion throughput, at which irregularities on the surface of the extruded piece become visible. Such irregularities strongly reduce the surface gloss and smoothness of the extruded piece, thus lowering the quality of the extruded article to an often unacceptable level.

As previously mentioned, the polyethylene composition of the present disclosure can be melt-processed at surprisingly high values of shear rate without undergoing pressure oscillations and flow instabilities.

While no necessary limitation is known to exist in principle regarding the polymerization processes and catalysts to be used, it has been found that the polyethylene composition of the present disclosure can be prepared in some embodiments by a gas phase polymerization process in the presence of a Ziegler-Natta catalyst.

A Ziegler-Natta catalyst comprises the product of the reaction of an organometallic compound of Groups 1, 2 or 13 of the Periodic Table of Elements with a transition metal compound of Groups 4 to 10 of the Periodic Table of Elements (new chemical notation). In certain embodiments, the transition metal compound can be selected from compounds of Ti, V, Zr, Cr and Hf and may be supported on $MgCl_2$.

In further embodiments, catalysts comprise the product of the reaction of an organometallic compound of Group 1, 2 or 13 of the Periodic Table of Elements with a solid catalyst component comprising a Ti compound and an electron donor compound (ED) supported on $MgCl_2$.

In some embodiments, organometallic compounds are organo-Al compounds.

In one embodiment, the polyethylene composition of the present disclosure is obtainable by using a Ziegler-Natta polymerization catalyst, such as a Ziegler-Natta catalyst supported on $MgCl_2$, including a Ziegler-Natta catalyst comprising the product of the reaction of:
a) a solid catalyst component comprising a Ti compound and an electron donor compound ED supported on $MgCl_2$;
b) an organo-Al compound; and optionally
c) an external electron donor compound $ED_{ext}$.

In some embodiments, component a) the ED/Ti molar ratio ranges from 1.5 to 3.5 and the Mg/Ti molar ratio is higher than 5.5, such as from 6 to 80.

Titanium compounds for use in the present disclosure are the tetrahalides or the compounds of formula $TiX_n(OR^1)_{4-n}$, where $0 \leq n \leq 3$, X is halogen, such as chlorine, and $R^1$ is $C_1$-$C_{10}$ hydrocarbon group.

The ED compound may be selected from alcohol, ketones, amines, amides, nitriles, alkoxysilanes, aliphatic ethers, and esters of aliphatic carboxylic acids.

In certain embodiments, the ED compound is selected from amides, esters and alkoxysilanes.

Excellent results have been obtained from the use of esters, which may be used as the ED compound of the present technology, non-limiting examples of esters are the alkyl esters of $C_1$-$C_{20}$ aliphatic carboxylic acids, including $C_1$-$C_8$ alkyl esters of aliphatic mono-carboxylic acids such as ethyl acetate, methyl formate, ethyl formate, methyl acetate, propyl acetate, i-propyl acetate, n-butyl acetate, and i-butyl acetate. Moreover, the aliphatic ethers such as the $C_2$-$C_{20}$ aliphatic ethers, such as tetrahydrofuran (THF) or dioxane, may be used.

In the solid catalyst component the $MgCl_2$ is the basic support, even if minor amount of additional carriers are used. The $MgCl_2$ can be used as such or obtained from Mg compounds used as precursors that can be transformed into $MgCl_2$ by reaction with halogenating compounds. In some embodiments, the use of $MgCl_2$ in active form, which is known from the patent literature as a support for Ziegler-Natta catalysts, is employed. U.S. Pat. Nos. 4,298,718 and 4,495,338 were the first to describe the use of these compounds in Ziegler-Natta catalysis. It is known from these patents that the magnesium dihalides in active form used as supports or co-supports in components of catalysts for the polymerization of olefins may be characterized by X-ray spectra, in which the most intense diffraction line that appears in the ASTM-card reference of the spectrum of the non-active halide is diminished in intensity and appears broadened. In the X-ray spectra of magnesium dihalides in active form, the most intense line is diminished in intensity and replaced by a halo, whose maximum intensity is displaced towards lower angles relative to that of the most intense line.

The preparation of the polyethylene composition of the present disclosure are produced, in some embodiments, from catalysts wherein the solid catalyst component a) is obtained by first contacting the titanium compound with the $MgCl_2$, or a precursor Mg compound, optionally in the presence of an inert medium, thus preparing an intermediate product a') containing a titanium compound supported on $MgCl_2$, in which the intermediate product a') is then contacted with the ED compound, which is added to the reaction mixture alone or in a mixture with other compounds, in which it represents the main component, optionally in the presence of an inert medium.

The term "main component" refers to conditions where the ED compound is the main component in terms of molar amount, with respect to the other possible compounds, excluding inert solvents or diluents used to handle the contact mixture. The ED treated product can then be subjected to washings with the proper solvents in order to recover the final product. If needed, treatment with the ED compound can be repeated one or more times.

As previously mentioned, a precursor of $MgCl_2$ can be a Mg compound. This compound can be selected, for example, from among Mg compounds of the formula $MgR'_2$, where the R' groups can be independently $C_1$-$C_{20}$ hydrocarbon groups that are optionally substituted, OR groups, OCOR groups, chlorine, in which R is a $C_1$-$C_{20}$ hydrocarbon groups optionally substituted, wherein the R' groups are not simultaneously chlorine. Also suitable as precursors are Lewis adducts of $MgCl_2$ and suitable Lewis bases. These adducts may include $MgCl_2$ $(R''OH)_m$ adducts, in which the R" groups are $C_1$-$C_{20}$ hydrocarbon groups, including $C_1$-$C_{10}$ alkyl groups, and m is from 0.1 to 6, such as from 0.5 to 3 and from 0.5 to 2. Adducts of this type can generally be obtained by mixing alcohol and $MgCl_2$ in the presence of an inert hydrocarbon immiscible with the adduct, operating under stirring conditions at the melting temperature of the adduct (100-130° C.). The emulsion is then quickly quenched, thereby causing the solidification of the adduct in the form of spherical particles. Representative methods for the preparation of these spherical adducts are reported, for example, in U.S. Pat. Nos. 4,469,648 and 4,399,054, and WIPO Pat. App. Pub. No. WO98/44009. Another useable method for the spherulization of the adducts is the spray cooling method described in U.S. Pat. Nos. 5,100,849 and 4,829,034.

In some embodiments, $MgCl_2 \bullet (EtOH)_m$ adducts in which m is from 0.15 to 1.7 are obtained by subjecting the adducts to a higher alcohol content in a thermal dealcoholation process carried out in a nitrogen flow at temperatures between 50 and 150° C. until the alcohol content is reduced to the above referenced value. A process of this type is described in EP Pat. No. 395083.

In certain embodiments, the dealcoholation can be carried out chemically by contacting the adduct with compounds capable of reacting with the alcohol groups.

Generally, these dealcoholated adducts may be characterized by a porosity (measured by mercury method) due to pores with radius up to 0.1 μm ranging from 0.15 to 2.5 $cm^3/g$, including from 0.25 to 1.5 $cm^3/g$.

In certain embodiments, the dealcoholation reaction is carried out simultaneously with a reaction step involving a titanium compound. Accordingly, these adducts are reacted with the $TiX_n(OR^1)_{4-n}$ compound (or possibly mixtures thereof) mentioned above, such as titanium tetrachloride. The reaction with the Ti compound can be carried out by suspending the adduct in $TiCl_4$ (generally under cold conditions). The mixture may be heated up to temperatures ranging from 80-130° C. and kept at this temperature for 0.5-2 hours. The treatment with the titanium compound can be carried out one or more times, e.g. it may be repeated twice. It can also be carried out in the presence of an electron donor (ED) compound such as those mentioned above. At the end of the process, the solid is recovered by separation of the suspension via conventional methods (such as settling and removing of the liquid, filtration, and/or centrifugation) and can be subject to washings with solvents. Although the washings are typically carried out with inert hydrocarbon liquids, it is also possible to use more polar solvents (having, for example, a higher dielectric constant) such as halogenated hydrocarbons.

As mentioned above, the intermediate product may be brought into contact with the ED compound under conditions capable of fixing an effective amount of the donor to the solid. Due to the high versatility of this method, the amount of donor used can vary. As an example, it can be used in molar ratio with respect to the Ti content in the intermediate product ranging from 0.5 to 20, such as from 1 to 10. In some embodiments, the contact is optionally carried out in a liquid medium such as a liquid hydrocarbon. The temperature at which the contact takes place can vary depending on the nature of the reagents. For instance, the temperature may be in a range from −10 to 150° C., including from 0 to 120° C. Temperatures causing the decomposition or degradation of any specific reagent(s) should be avoided, even if they fall within the aforementioned ranges. The time of the treatment can vary in dependence of other conditions such as nature of the reagents, temperature, concentration, etc. In some embodiments, this contact step can last from 10 minutes to 10 hours, such as from 0.5 to 5 hours. If desired, in order to further increase the final donor content, this step can be repeated one or more times. At the end of this step, the solid may be recovered by the separation of the suspension via conventional methods (such as the settling and removing of the liquid, filtration, and centrifugation) and can be subject to washings with solvents. Although the washings may be carried out with inert hydrocarbon liquids, it is also possible to use more polar solvents (having, for example, a higher dielectric constant) such as halogenated or oxygenated hydrocarbons.

As previously mentioned, the solid catalyst component is converted into catalysts for the polymerization of olefins by reacting it, according to known methods, with an organometallic compound of Group 1, 2 or 13 of the Periodic Table of Elements, such as with an Al-alkyl compound.

The alkyl-Al compound may be chosen from among the trialkyl aluminum compounds such as, for example, triethylaluminum, triisobutylaluminum, tri-n-butylaluminum, tri-n-hexylaluminum, and tri-n-octylaluminum. It is also possible to use alkylaluminum halides, alkylaluminum hydrides or alkylaluminum sesquichlorides such as $AlEt_2Cl$ and $Al_2Et_3Cl_3$, optionally in mixture with trialkyl aluminum compounds.

The external electron donor compound ($ED_{ext}$) may be optionally used to prepare Ziegler-Natta catalysts such that the compound can be equal to or different from the ED used in the solid catalyst component a). In some embodiments, $ED_{ext}$ is selected from the group consisting of ethers, esters, amines, ketones, nitriles, silanes and their mixtures, such as the $C_2$—$C_{20}$ aliphatic ethers and cyclic ethers having 3-5 carbon atoms such as tetrahydrofuran and dioxane.

Specific examples of Ziegler-Natta catalysts and methods for their preparation are provided in WIPO Pat. App. Pub. No. WO2004106388. However, the prepolymerization of the solid catalyst component containing the Ti compound and the electron donor compound ED (solid catalyst component a)) described therein is consistent with embodiments of the present disclosure.

In some embodiments, the polyethylene composition of the present disclosure is obtainable by a process wherein all the polymerization steps are carried out in the presence of the catalyst.

By using the above described polymerization catalyst, the polyethylene composition of the present disclosure can be prepared in a process comprising the following steps, in any mutual order:

a) polymerizing ethylene, optionally together with one or more comonomers, in a gas-phase reactor in the presence of hydrogen;
b) copolymerizing ethylene with one or more comonomers in another gas-phase reactor in the presence of an amount of hydrogen less than that in step a);

where in at least one of the gas-phase reactors the growing polymer particles flow upward through a first polymerization zone (riser) under fast fluidization or transport conditions, leave the riser and enter a second polymerization zone (downcomer) through which they flow downward under the action of gravity, leave the downcomer and are re-introduced into the riser, thus establishing a circulation of polymer between the two polymerization zones. In some embodiments, in the first polymerization zone (riser), fast fluidization conditions are established by feeding a gas mixture comprising one or more olefins (ethylene and comonomers) at a velocity higher than the transport velocity of the polymer particles. The velocity of the gas mixture may be between 0.5 and 15 m/s, such as between 0.8 and 5 m/s. The terms "transport velocity" and "fast fluidization conditions" are well known in the art; see, for example, D. Geldart, Gas Fluidisation Technology, page 155 et seq., J. Wiley & Sons Ltd., 1986.

In certain embodiments, in the second polymerization zone (downcomer), the polymer particles flow under the action of gravity in a densified form, so that high values of density of the solid are reached (mass of polymer per volume of reactor), which approach the bulk density of the polymer.

In other words, the polymer flows vertically down through the downcomer in a plug flow (packed flow mode), so that only small quantities of gas are entrained between the polymer particles.

Such process allows one to obtain from step a) an ethylene polymer with a molecular weight lower than the ethylene copolymer obtained from step b).

In some embodiments, the polymerization of ethylene to produce a relatively low molecular weight ethylene polymer (step a) is performed upstream of the copolymerization of ethylene with a comonomer to produce a relatively high molecular weight ethylene copolymer (step b). In step a), a gaseous mixture comprising ethylene, hydrogen and an inert gas may be fed to a first gas-phase reactor, such as a gas-phase fluidized bed reactor. The polymerization may be carried out in the presence of a Ziegler-Natta catalyst. In certain embodiments, no comonomer is fed to the first gas phase reactor, and a highly crystalline ethylene homopolymer is obtained in step a). However, a minimal amount of comonomer may be fed with the proviso that the degree of copolymerization in step a) is limited such that the density of the ethylene polymer obtained in step a) is not less than 0.960 g/cm$^3$.

In some embodiments, hydrogen is fed in an amount depending on the specific catalyst used to obtain in step a) an ethylene polymer with a melt flow index (MIE) from 10 to 35 g/10 min. In order to obtain this MIE range, in step a) the hydrogen/ethylene molar ratio may be from 0.5 to 2, and the amount of ethylene monomer is 5 to 50% by volume, including from 5 to 30% by volume, based on the total volume of gas present in the polymerization reactor. The remaining portion of the feeding mixture is represented by inert gases and, optionally, one or more comonomers. Inert gases which are necessary to dissipate the heat generated by the polymerization reaction may be selected from nitrogen and saturated hydrocarbons such as propane.

In some embodiments, the operating temperature in the reactor of step a) is between 50 and 120° C., such as between 65 and 100° C., while the operating pressure is between 0.5 and 10 MPa, including between 2.0 and 3.5 MPa.

In one embodiment, the ethylene polymer obtained in step a) represents from 30 to 50% by weight of the total ethylene polymer produced in the overall process, i.e. the polymer produced in the first and second serially connected reactors.

In some embodiments, the ethylene polymer coming from step a) and the entrained gas are then passed through a solid/gas separation step in order to prevent the gaseous mixture coming from the first polymerization reactor from entering the reactor of step b) (the second gas-phase polymerization reactor). The gaseous mixture can be recycled back to the first polymerization reactor, while the separated ethylene polymer may be fed to the reactor of step b). A suitable point of feeding of the polymer into the second reactor is the connecting part between the downcomer and the riser, where the solid concentration may be sufficiently low such that the flow conditions are not negatively affected.

In some embodiments, the operating temperature in step b) is in the range of 65 to 95° C., and the pressure is in the range of 1.5 to 4.0 MPa. The second gas-phase reactor may produce a relatively high molecular weight ethylene copolymer by copolymerizing ethylene with one or more comonomers. Furthermore, in order to broaden the molecular weight distribution of the final ethylene polymer, the reactor of step b) can be conveniently operated to establish different conditions of monomers and hydrogen concentration within the riser and the downcomer.

For instance, in step b) the gas mixture entraining the polymer particles and coming from the riser can be partially or totally prevented from entering the downcomer, so to obtain two different gas composition zones. This result can be achieved by feeding a gas and/or a liquid mixture into the downcomer through a line placed at a suitable point of the downcomer, such as in the upper part of the downcomer. In some embodiments, the gas and/or liquid mixture has a suitable composition that differs from that of the gas mixture present in the riser. The flow of the gas and/or liquid mixture can be regulated so that an upward flow of gas, countercurrent to the flow of the polymer particles, is generated, such as at the top of the riser, for acting as a barrier to the gas mixture entrained among the polymer particles coming from the riser. In some embodiments, feeding a polymer mixture with low content of hydrogen in order to produce a higher molecular weight polymer fraction in the downcomer may be employed. One or more comonomers can be fed to the downcomer of step b), optionally with ethylene, propane and/or other inert gases.

In some embodiments, the hydrogen/ethylene molar ratio in the downcomer of step b) is between 0.005 and 0.2, the ethylene concentration is from 1 to 20%, including 3-10%, by volume, the comonomer concentration is from 0.2 to 1% by volume, based on the total volume of gas present in the downcomer. The balance of the volume in the downcomer is propane or similarly inert gases. Since a very low molar concentration of hydrogen is present in the downcomer, by carrying out the process of the present disclosure it is possible to bond a relatively high amount of comonomer to the high molecular weight polyethylene fraction.

In certain embodiments, the polymer particles coming from the downcomer are reintroduced in the riser of step b).

Since the polymer particles keep reacting and no more comonomer is fed to the riser, the concentration of the comonomer drops to a range of 0.1 to 0.5% by volume, based on the total volume of gas present in the riser. In some embodiments, the comonomer content is controlled in order to obtain the desired density of the final polyethylene. In the riser of step b) the hydrogen/ethylene molar ratio is in the range of 0.05 to 0.3, the ethylene concentration is between 5 and 15% by volume, based on the total volume of gas present in the riser. The balance of the volume in the riser is propane or other inert gases.

More details on the above described polymerization process are provided in WIPO Pat. App. Pub. No. WO9412568.

EXAMPLES

The following examples are given to illustrate, without limiting, the present technology.

Unless stated otherwise, the following test methods are used to determine the properties reported in the Detailed Description of the Invention and in the Examples.

Density

Determined according to ISO 1183 at 23° C.

Molecular Weight Distribution Determination

The determination of the molar mass distributions and the means for Mn, Mw and Mw/Mn derived therefrom were carried out by high-temperature gel permeation chromatography using a method described in the ISO 16014-1, -2, and -4 issues of 2003. The specific details according to the mentioned ISO standards are as follows: the solvent is 1,2,4-trichlorobenzene (TCB), the temperature of apparatus and solutions is 135° C., and a PolymerChar (Valencia, Paterna 46980, Spain) IR-4 infrared concentration detector, capable for use with TCB, was used. A WATERS Alliance GPC 2000 system equipped with the following pre-column SHODEX UT-G and separation columns: SHODEX UT 806 M (3×) and SHODEX UT 807 (Showa Denko Europe GmbH, Konrad-Zuse-Platz 4, 81829 Muenchen, Germany) connected in series was used. The solvent was vacuum distilled under nitrogen and was stabilized with 0.025% by weight of 2,6-di-tert-butyl-4-methylphenol. The flow rate used was 1 ml/min, the injection volume was 500 μl and polymer concentration was in the range of 0.01%<conc.<0.05% w/w. The molecular weight calibration was established by using monodispersed polystyrene (PS) standards from Polymer Laboratories (now Agilent Technologies, Herrenberger Str. 130, 71034 Boeblingen, Germany) in the range from 580 g/mol up to 11600000 g/mol, and additionally with hexadecane. The calibration curve was then adapted to polyethylene (PE) by means of the universal calibration method (please see Benoit H., Rempp P. and Grubisic Z., and in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim, Germany) respectively.

Shear-Induced Crystallization Test

This method is utilized to determine the onset time of shear-induced crystallization (SIC) of the polymer, $t_{onset,SIC}$. Samples are melt-pressed at 210° C. for 4 min under 200 bar of pressure in a lab press to produce 1 mm thick-plaques. Disc specimens are cut-out with a diameter of 25 mm. The samples are inserted in the plate-plate oscillatory-shear rheometer. A Physica MCR 301 rotational rheometer from AntonPaar is used.

The sample is then molten inside the test-geometry at 190° C. for 4 min, cooled down at a rate of ~10K/min to the test temperature, T=125° C., and annealed for 5 min. Consequently, steady-shear under constant shear rate is applied and the shear viscosity is monitored as a function of time. The experiment is repeated, applying each time a different shear-rate ranging from 0.05 to 0.5 $s^{-1}$. The onset time for SIC, $t_{onset,SIC}$, is taken at the point where the viscosity has increased at 50% of its steady-state value η at 125° C. The steady-state value is the average of the steady-shear melt viscosity measured at the specific temperature.

The plot of log $t_{onset,SIC}$ vs. $\log_{shear-rate}$ provides a linear function (y=Ax+B) which is extrapolated to a shear rate of 1000 $s^{-1}$ (process-relevant) to determine the value of $t_{onset,SIC}$ at 1000 $s^{-1}$.

The SIC Index is then calculated according to the following relation:

$$\text{SIC Index} = (t_{onset,SIC}@1000 \times t_{onset,quiescent})/((HLMI)*100)$$

The $t_{onset,quiescent}$ (in sec) is the crystallization onset at a temperature of 125° C. under quiescent conditions, i.e. no shearing, measured in isothermal mode in a differential-scanning-calorimetry apparatus (DSC), as hereinafter explained.

HLMI is the melt flow index (g/10 min) measured at T=190° C. with a 21.6 kg load, according to ISO 1133.

The same protocol is described in the following documents:

I. Vittorias, *Correlation among structure, processing and product properties*, Würzburger Tage 2010, Wolfgang Kunze TA Instruments, Germany.

Wo DL, Tanner RI (2010), *The impact of blue organic and inorganic pigments on the crystallization and rheological properties of isotactic polypropylene*, Rheol. Acta 49, 75.

Derakhshandeh M., Hatzikiriakos S. G., *Flow-induced crystallization of high-density polyethylene: the effects of shear and uniaxial extension*, Rheol. Acta, 51, 315-327, 2012.

Isothermal DSC

The $t_{onset,quiescent}$, the onset time when no deformation is applied at 125° C., is determined by the iso-DSC (isothermal differential scanning calorimetry) method. It is measured at 125° C. in a TA Instruments Q2000 DSC apparatus. The determination of the $t_{onset,quiescent}$ is performed utilizing the commercially available software TA Universal Analysis 2000. The sample preparation and set-up follows the DIN EN ISO 11357-1:2009 and ISO 11357-3:1999.

Melt Flow Index

Determined according to ISO 1133 at 190° C. with the specified load.

Long Chain Branching Index (LCB)

The LCB index corresponds to the branching factor g', measured for a molecular weight of $10^6$ g/mol. The branching factor g', which allows for the determination of long-chain branches at high Mw, was measured by Gel Permeation Chromatography (GPC) coupled with Multi-Angle Laser-Light Scattering (MALLS), as described below. The parameter g' is the ratio of the measured mean square radius of gyration to that of a linear polymer having the same molecular weight. Linear molecules show a g' value of 1, while values of less than 1 indicate the presence of LCB. Values of g' as a function of molecular weight, M, were calculated from the following equation:

$$g'(M) = \langle Rg^2 \rangle_{sample,M} / \langle Rg^2 \rangle_{linear\ ref.,M}$$

where $\langle Rg^2 \rangle, M$ is the root-mean-square radius of gyration for the fraction of molecular weight M.

The radius of gyration for each fraction eluted from the GPC (as described above but with a flow rate of 0.6 ml/min and a column packed with 30 μm of particles) is measured by analyzing the light scattering at the different angles. Therefore, from this MALLS setup it is possible to determine the molecular weight M and $\langle Rg^2 \rangle_{sample,M}$ and to define a g' at a measured $M=10^6$ g/mol. The $\langle Rg^2 \rangle_{linear\ ref.,M}$ is calculated by the relationship between the radius of gyration and the molecular weight for a linear polymer in solution (Zimm and Stockmayer W H 1949)) and confirmed by measuring a linear PE reference with the same apparatus and methodology described.

The protocol is described in the following documents:

Zimm B H, Stockmayer W H (1949) *The dimensions of chain molecules containing branches and rings.* J Chem Phys 17.

Rubinstein M., Colby R H. (2003), *Polymer Physics*, Oxford University Press.

Comonomer Content

The comonomer content is determined by means of infrared (IR) spectroscpy in accordance with ASTM D 6248 98, using an FT-IR spectrometer Tensor 27 from Bruker, calibrated with a chemometric model for determining ethyl- or butyl side chains in PE for butene or hexene as the comonomer, respectively.

Swell Ratio

The swell ratio of the resulting polymers is measured utilizing a capillary rheometer, Göttfert Rheotester2000 and Rheograph 25, at T=190° C., equipped with a commercially available 30/2/2/20 die (total length=30 mm, active length=2 mm, diameter=2 mm, L/D=2/2 and a 20° entrance angle) and an optical device (laser diode from Göttfert) for measuring the extruded strand thickness. The sample is molten in the capillary barrel at 190° C. for 6 min and extruded with a piston velocity corresponding to a resulting shear-rate at the die of 1440 $s^{-1}$. The extrudate is cut (by an automatic cutting device from Göttfert) at a distance of 150 mm from the die-exit at the moment the piston reaches a position of 96 mm from the die-inlet. The extrudate diameter is measured with the laser diode at a distance of 78 mm from the die-exit, as a function of time. The maximum value corresponds to the $D_{extrudate}$. The swell-ratio is determined from the calculation: $SR=(D_{extrudate}-D_{die})100\%/D_{die}$ where $D_{die}$ is the corresponding diameter at the die exit, measured with the laser diode.

Shrinkage at 1500 $s^{-1}$ (Shrinkage Lab-test)

This method is applied to determine the shrinkage of the final product of polyethylene after melt extrusion, or in other words the dimensional stability potential of a grade. The method is recommended for homogeneous PE in granulated form. Samples in powder form can be measured only after stabilizing and melt homogenization of the sample (typically in a lab plasticizer kneader). However, in the latter case, the sample is often more sensitive to degradation and air-bubbles in the extrudate.

The samples in granulate form can be used directly, and approximately 20 g of sample are needed for filling the capillary barrel. The utilized capillary rheometer is a Göttfert Rheotester 2000, with a 15 mm diameter barrel and an applicable pressure range of 0-2000 bar, temperatures of 25-400° C., and equipped with a 30/2/2/20 die, with total length of 30 mm, an L/D=2/2 and a 20° entrance angle. The recommended test temperature for polyethylene is 210° C.

The piston speed is set in order to have the required apparent shear rate at the die exit. The test is performed at shear rates of 50 $s^{-1}$, 1000 $s^{-1}$, 1500 $s^{-1}$ and 2500 $s^{-1}$.

The extrudate is marked and pieces of 40 mm length each are punched and stamped, while still in the molten state, and left to cool at room temperature. At least 3 parts of 40 mm must be marked in this way. A pinch-off metal tool is utilized to stamp the extrudate after the die exit in the parts to be measured, with a length of 40 mm (initial length for each part, $L_{i,0}$) and a typical width of 10 mm.

The whole extrudate is cut and left on a lab table to crystallize and cool down at room temperature for at least 15 min. The parts are cut at the marks and measured in length. The resulting length, $L_i$, in mm is recorded for each part i and averaged for 4 parts.

$$Shrinkage_i = \frac{L_0 - L_i}{L_0} \times 100\% = \frac{\Delta L_i}{L_0} \times 100\%$$

$$Shrinkage_{average} = \frac{\sum Shrinkage_i}{i}$$

The procedure is undertaken for each applied shear-rate and the measurement of shrinkage for each shear-rate is repeated at least two times.

Remark: Deviations of the shrinkage along the extrudate length are expected, i.e. due to varying cooling times after exiting the die for each part and sagging (i.e., the punched part leaving the die last will be less exposed over time to room temperature and "stretched" due to the extrudate weight).

Critical Shear Rate for Sharkskin (Sharkskin Test)

The sharkskin test is a method to quantify the flow instabilities and surface defects occurring during the extrusion of polymer melts. The commercial sharkskin-option with the Rheotester2000 capillary rheometer from Göttfert is used. The sharkskin-option is a slit-die of 30×3×0.3 mm with three pressure transducers distributed along the die (at the die entry, middle and before the die exit). The pressure is recorded and analyzed (via Fourier transformation) using the commercially available Göttfert WebRheo software.

The polymer is extruded at 190° C. by applying the following shear-rates in this specific order: 100-150-200-250-300-350-400-450-500 $s^{-1}$. The extrudate is then visually inspected for surface defects. The critical shear-rate for sharkskin instability is the applied shear-rate for which the sharkskin instability first occurs (via high frequency pressure oscillations and visually detectable periodic surface distortions).

The same protocol is described in the following documents:

Palza H., Naue I. F. C., Wilhelm M., Filipe S., Becker A., Sunder J., Göttfert A., *On-Line Detection of Polymer*

*Melt Flow Instabilities in a Capillary Rheometer*, KGK. Kautschuk, Gummi, Kunststoffe, 2010, vol. 63, no 10, pp. 456-461.

Susana Filipe, Iakovos Vittorias, Manfred Wilhelm, *Experimental Correlation between Mechanical Non-Linearity in LAOS Flow and Capillary Flow Instabilities for Linear and Branched Commercial Polyethylenes*, Macromol. Mat. and Eng., Volume 293, Issue 1, pages 57-65, 2008.

Göttfert, A.; Sunder, J., AIP Conference Proceedings, Volume 1027, pp. 1195-1197 (2008).

Notched Tensile Impact Test

The tensile impact strength is determined using ISO 8256:2004 with type 1 double notched specimens according to method A. The test specimens (4×10×80 mm) are cut from a compression molded sheet which has been prepared according ISO 1872-2 requirements (with an average cooling rate 15 K/min and high pressure applied during the cooling phase). The test specimens are notched on two sides with a 45° V-notch. The depth of the V-notch is 2±0.1 mm and curvature radius of the notch dip is 1.0±0.05 mm. The free length between the grips is 30±2 mm. Before the measurement, all test specimens are conditioned at a constant temperature of −30° C. over a period of from 2 to 3 hours. The procedure for measurements of tensile impact strength including an energy correction following method A is described in ISO 8256.

Environmental Stress Cracking Resistance According to the Full Notch Creep Test (FNCT)

The environmental stress cracking resistance of polymer samples is determined in accordance to international standard ISO 16770 (FNCT) in aqueous surfactant solution. From the polymer sample a compression molded 10 mm thick sheet has been prepared. The bars with squared cross section (10×10×100 mm) are notched using a razor blade on four sides perpendicularly to the stress direction. A notching device described by M. Fleissner in Kunststoffe 77 (1987), pp. 45, is used for the sharp notch with a depth of 1.6 mm. The load applied is calculated from the tensile force divided by the initial ligament area. The ligament area is the remaining area of the total cross-section area of specimen minus the notch area. For FNCT specimen: 10×10 mm²−4 times of trapezoid notch area=46.24 mm² (the remaining cross-section for the failure process/crack propagation). The test specimen is loaded with the standard conditions suggested by the ISO 16770 with constant load of 4 MPa at 80° C. in a 2% (by weight) water solution of non-ionic surfactant ARKOPAL N100. The time elapsed until the rupture of the test specimen is detected.

Charpy aFM

The fracture toughness determination was performed by an internal method on test bars measuring 10×10×80 mm which had been sawn out of a compression molded sheet with a thickness of 10 mm. Six of these test bars are notched in the center using a razor blade in the notching device mentioned above for FNCT. The notch depth is 1.6 mm. The measurement is carried out substantially in accordance with the Charpy measurement method of ISO 179-1, with modified test specimens and modified impact geometry (distance between supports). All test specimens are conditioned to the measurement temperature of 0° C. over a period of from 2 to 3 hours. A test specimen is then placed without delay onto the support of a pendulum impact tester in accordance with ISO 179-1. The distance between the supports is 60 mm. The drop of the 2 J hammer is triggered, with the drop angle being set to 160°, the pendulum length to 225 mm and the impact velocity to 2.93 m/s. The fracture toughness value is expressed in kJ/m² and is given by the quotient of the impact energy consumed and the initial cross-sectional area at the notch, aFM. Only values for complete fracture and hinge fracture were used (see suggestion by ISO 179-1).

Examples 1, 2 and Comparative Examples 1 and 2

Process Setup

In Examples 1-2 the process of the disclosure was carried out under continuous conditions in a plant comprising two serially connected gas-phase reactors, as shown in FIG. 1.

Comparative Example 1 is carried out in the same plant under continuous conditions as well.

Example 1

The solid catalyst component was prepared as described in Example 13 of WIPO Pat. App. Pub. No. WO2004106388. The AcOEt/Ti molar ratio was 8.

Polymerization 7 g/h of the solid catalyst component prepared as described above were fed, using 5 kg/h of liquid propane, to a precontacting apparatus, in which a mixture of triisobutylaluminum (TIBA) and diethylaluminum chloride (DEAC) as well tetrahydrofuran (THF) were dosed. The weight ratio between TIBA and DEAC was 7:1. The weight ratio between aluminum alkyl and solid catalyst component was 10:1. The weight ratio between aluminum alkyl and THF was 70. The precontacting step was carried out under stirring at 50° C. with a total residence time of 70 minutes.

The catalyst enters the first gas-phase polymerization reactor 1 of FIG. 1 via line 10. In the first reactor ethylene was polymerized using $H_2$ as a molecular weight regulator in the presence of propane as an inert diluent. 35 kg/h of ethylene and 62 g/h of hydrogen were fed to the first reactor via line 9. No comonomer was fed to the first reactor.

The polymerization was carried out at a temperature of 75° C. and at a pressure of 2.5 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 25 g/10 min and a density of 0.966 kg/dm³.

The second reactor was operated under polymerization conditions of about 80° C. and a pressure of 2.5 MPa. 14 kg/h of ethylene and 0.75 kg/h of 1-hexene were introduced in the downcomer 33 of the second reactor via line 46. 5 kg/h of propane, 28.5 kg/h of ethylene and 3.1 g/h of hydrogen were fed through line 45 into the recycling system.

In order to broaden the molecular weight distribution of the final ethylene polymer, the second reactor was operated by establishing different conditions of monomers and hydrogen concentration within the riser 32 and the downcomer 33. This is achieved by feeding 330 kg/h of a liquid stream (liquid barrier) into the upper part of the downcomer 33 using line 52. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 52° C. and 2.5 MPa, where a part of the recycle stream is cooled and partially condensed. As shown in the FIGURE, a separating vessel and a pump are placed downstream of the condenser 49. The final polymer was discontinuously discharged via line 54.

The polymerization process in the second reactor produced relatively high molecular weight polyethylene fractions. In Table 1 the properties of the final product are specified. It can be seen that the melt index of the final product is decreased as compared to the ethylene resin produced in the first reactor, showing the formation of high molecular weight fractions in the second reactor.

The first reactor produced around 44.5% by weight (split wt %) of the total amount of the final polyethylene resin produced by both the first and second reactors. At the same time, the resulting polymer is endowed with a relatively broad molecular weight distribution as witnessed by a ratio MIF/MIP equal to 23.7.

Example 2

The process of the disclosure was carried out with the same setup and the same polymerization catalyst of Example 1. In addition, the process conditions and consequently the obtained polymer properties of the first reactor were the same.

The second reactor was operated under polymerization conditions of about 80° C., and a pressure of 2.5 MPa. 14 kg/h of ethylene and 0.86 kg/h of 1-hexene were introduced in the downcomer of the second reactor via line 46. 5 kg/h of propane, 27.4 kg/h of ethylene and 3.6 g/h of hydrogen were fed through line 45 into the recycling system.

In order to broaden the molecular weight distribution of the final ethylene polymer, the second reactor was operated by establishing different conditions of monomers and hydrogen concentrations within the riser 32 and the downcomer 33. 330 kg/h of barrier liquid were fed via line 52. The gas compositions of the riser, the downcomer and the liquid barrier are indicated in Table 1. The liquid stream of line 52 comes from the condensation step in the condenser 49, at working conditions of 51° C. and 2.5 MPa, where a part of the recycle stream is cooled and partially condensed.

The first reactor produced around 45% by weight (split wt %) of the total amount of the final polyethylene resin produced by both the first and second reactors. At the same time, the resulting polymer is endowed with a relatively broad molecular weight distribution as witnessed by a ratio MIF/MIP equal to 22.5.

Comparative Example 1

The polymerization was carried out using the same setup of Examples 1 and 2, but the polymerization catalyst was the same as used in Example 6 of WIPO Pat. App. Pub. No. WO2005019280.

8 g/h of the solid catalyst component prepared as described above were fed, using 5 kg/h of liquid propane, to a precontacting apparatus, in which triethylaluminum (TEA) as well tetrahydrofuran (THF) were dosed. The weight ratio between the aluminum alkyl compound and the solid catalyst component was 5:1. The weight ratio between the aluminum alkyl compound and THF was 44. The precontacting step was carried out under stirring at 50° C., with a total residence time of 70 minutes.

The catalyst enters the first gas-phase polymerization reactor 1 of FIG. 1 via line 10. In the first reactor ethylene was polymerized using $H_2$ as a molecular weight regulator and in the presence of propane as an inert diluent. 40 kg/h of ethylene and 75 g/h of hydrogen were fed to the first reactor via line 9. No comonomer was fed to the first reactor.

The polymerization was carried out at a temperature of 80° C. and at a pressure of 2.4 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 100 g/10 min and a density of 0.968 kg/dm$^3$.

The second reactor was operated under polymerization conditions of about 80° C., and a pressure of 2.1 MPa. 12 kg/h of ethylene and 1.5 kg/h of 1-hexene were introduced in the downcomer 33 of the second reactor via line 46. 5 kg/h of propane, 26.5 kg/h of ethylene and 1.2 g/h of hydrogen were fed through line 45 into the recycling system.

In order to broaden the molecular weight distribution of the final ethylene polymer, the second reactor was operated by establishing different conditions of monomers and hydrogen concentrations within the riser 32 and the downcomer 33. This is achieved by feeding via line 52, 200 kg/h of a liquid stream (liquid barrier) into the upper part of the downcomer 33. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 53° C. and 2.1 MPa, where a part of the recycle stream is cooled and partially condensed. As shown in the FIGURE, a separating vessel and a pump are placed downstream of the condenser 49. The final polymer was discontinuously discharged via line 54.

The polymerization process in the second reactor produced relatively high molecular weight polyethylene fractions. In Table 1 the properties of the final product are specified. It can be seen that the melt index of the final product is decreased as compared to the ethylene resin produced in the first reactor, showing the formation of high molecular weight fractions in the second reactor.

The first reactor produced around 50% by weight (split wt %) of the total amount of the final polyethylene resin produced by both the first and second reactors. At the same time, the resulting polymer is endowed with a relatively broad molecular weight distribution as witnessed by a ratio MIF/MIP equal to 38.8

Comparative Example 2

The polymer of Comparative Example 2 is a polyethylene composition prepared with a Cr-catalyst, in a single gas-phase reactor, as previously described in the relevant literature.

TABLE 1

|  | Ex. 1 | Ex. 2 | Comp. 1 | Comp. 2 |
|---|---|---|---|---|
| Operative conditions first reactor |  |  |  |  |
| $H_2/C_2H_4$ Molar ratio | 1.9 | 1.9 | 1.7 |  |
| $C_2H_4$ % | 12.1 | 12.4 | 14 |  |
| Split (wt %) | 44.5 | 45 | 50 |  |

TABLE 1-continued

|  | Ex. 1 | Ex. 2 | Comp. 1 | Comp. 2 |
|---|---|---|---|---|
| Operative conditions second reactor | | | | |
| $H_2/C_2H_4$ Molar ratio riser | 0.157 | 0.203 | 0.038 | |
| $C_2H_4$ % riser | 11.3 | 11.4 | 15 | |
| $C_6H_{12}$ riser | 0.56 | 0.65 | 1.2 | |
| $H_2/C_2H_4$ Molar ratio downcomer | 0.069 | 0.086 | 0.04 | |
| $C_2H_4$ % downcomer | 2.6 | 2.8 | 5.4 | |
| $C_6H_{12}$ downcomer | 0.60 | 0.71 | 2.2 | |
| $H_2/C_2H_4$ Molar ratio barrier | 0.013 | 0.015 | 0.01 | |
| $C_2H_4$ % barrier | 6.8 | 7.1 | 6.5 | |
| $C_6H_{12}$ barrier | 0.93 | 1.17 | 2.7 | |
| Final Polymer properties | | | | |
| MIP [5 kg] (g/10 min.) | 0.2 | 0.29 | 0.21 | 0.31 |
| MIF [21.6 kg] (g/10 min.) | 4.8 | 6.5 | 8.15 | 6.25 |
| MIF/MIP | 23.7 | 22.5 | 38.8 | 20.16 |
| Density (kg/dm$^3$) | 0.9509 | 0.9496 | 0.9487 | 0.947 |
| Mw [g/mol] | 3.5E+5 | 3.8E+5 | 3.6E+5 | 3.9E+5 |
| Mz [g/mol] | 2.0E+6 | 8.3E+6 | 5.0E+6 | 3.5E+6 |
| Mw/Mn | 25 | 27 | 52 | 25 |
| LCB | 0.89 | 0.84 | 0.69 | 0.99 |
| Comonomer content IR [% by weight] | 0.7% ± 0.1 ($C_6H_{12}$) | 0.7% ± 0.1 ($C_6H_{12}$) | 1.6 ($C_6H_{12}$) | 1.6 ($C_6H_{12}$) |
| SIC index | 3.8 | 3.3 | 1.9 | 6.1 |
| Swell ratio (%) | 179 | 171 | 120 | 210 |
| Shrinkage@1500 s$^{-1}$, T = 190° C. [%] | 15 | 12 | — | 23 |
| Critical shear-rate for sharkskin, T = 190° C., [1/s] | 300 | 300 | — | 200 |
| Notched-Tensile Impact test, T = −30° C. [kJ/m$^2$] | 164 | 155 | 93 | 145 |
| FNCT 4 MPa/80° C. (hours)* | 329 | 20 | >2000 | 4 |
| Charpy aFM, T = 0° C. [kJ/m$^2$] | — | — | 8.9 | |

Notes:
$C_2H_4$ = ethylene;
$C_6H_{12}$ = hexene;
*aqueous solution of 2% Arkopal N100

What is claimed is:

1. A polyethylene composition comprising:
   1) a density from 0.945 to less than 0.952 g/cm$^3$, determined according to ISO 1183 at 23° C.;
   2) a ratio MIF/MIP from 15 to 30, wherein the MIF is the melt flow index at 190° C. with a load of 21.60 kg, and the MIP is the melt flow index at 190° C. with a load of 5 kg, both determined according to ISO 1133; and
   3) a SIC Index from 2.5 to 5.5;
   wherein the SIC Index is the Shear-Induced Crystallization Index, determined according to the following relation:

SIC Index=$((t_{onset,SIC}@1000 \times t_{onset,quiescent})/((HLMI)*100))$ where $t_{onset,SIC}@1000$ is measured in seconds and is the time required for crystallization onset under a shear rate of 1000 s$^{-1}$, the $t_{onset, quiescent}$ is measured in seconds and is the crystallization onset time at a temperature of 125° C. under no shear, as determined in isothermal mode by differential scanning calorimetry; and HLMI is the melt flow index determined at 190° C. with a load of 21.6 kg, according to ISO 1133.

2. The polyethylene composition of claim 1, comprising one or more ethylene copolymers.

3. The polyethylene composition of claim 2, wherein the one or more ethylene copolymers have a comonomer content equal to or less than 1% by weight.

4. The polyethylene composition of claim 2, wherein the comonomer is selected from olefins having the formula $CH_2$=CHR wherein R is an alkyl radical, linear or branched, having from 1 to 10 carbon atoms.

5. The polyethylene composition of claim 1, produced by a Ziegler-Natta polymerization catalyst.

6. The polyethylene composition of claim 1, having at least one of the following properties:
   a Mw equal to or greater than 250,000 g/mol;
   a Mw/Mn from 20 to 30;
   a Long Chain Branching index equal to or greater than 0.70;
   a MIP from 0.05-0.5 g/10 min.; and
   a MIF from 1-15 g/10 min.

7. The polyethylene composition of claim 1, comprising:
   A) 30-50% by weight of an ethylene homopolymer or copolymer with a density equal to or greater than 0.960 g/cm$^3$ and melt flow index MIE at 190° C. with a load of 2.16 kg, according to ISO 1133, of 10-35 g/10 min.;
   B) 50-70% by weight of an ethylene copolymer having a MIE value lower than the MIE value of A).

8. The polyethylene composition of claim 1, wherein the polyethylene composition is formed in one or more polymerizing steps, wherein all the polymerization steps are carried out in the presence of a Ziegler-Natta polymerization catalyst supported on $MgCl_2$.

9. The polyethylene composition of claim 8, wherein the one or more polymerization steps comprise the following steps, in any mutual order:
   a) polymerizing ethylene, optionally together with one or more comonomers, in a gas-phase reactor in the presence of hydrogen;
   b) copolymerizing ethylene with one or more comonomers in another gas-phase reactor in the presence of an amount of hydrogen less than step a);

where in at least one of the gas-phase reactors the growing polymer particles flow upward through a first polymerization zone under fast fluidization or transport conditions, leave the riser and enter a second polymerization zone through which they flow downward under the action of gravity, leave the second polymerization zone and are reintroduced into the first polymerization zone for establishing a circulation of polymers between the two polymerization zones.

* * * * *

UNITED STATES PATENT AND TRADEMARK OFFICE
CERTIFICATE OF CORRECTION

PATENT NO. : 9,580,583 B2  
APPLICATION NO. : 15/215417  
DATED : February 28, 2017  
INVENTOR(S) : Iakovos Vittorias et al.

Page 1 of 2

It is certified that error appears in the above-identified patent and that said Letters Patent is hereby corrected as shown below:

On the Title Page

Item (57), Line 6  Delete "an" and insert --a--

In the Specification

Column 1  Line 10  Delete "2016,which" and insert --2016, which--

Column 2  Line 6  Delete "an" and insert --a--

Column 2  Lines 12-13  Delete "SIC Index=($t_{onset,SIC}$@1000×$t_{onset, quiescent}$)/((HLMI)*100)" and insert --SIC Index=($t_{onset,SIC}$@1000×$t_{onset,quiescent}$)/((HLMI)*100)--

Column 2  Line 16  Delete "1000 S$^{-1}$," and insert --1000 s$^{-1}$,--

Column 2  Line 16  Delete "$t_{onset, quiescent}$" and insert --$t_{onset,quiescent}$--

Column 2  Line 16  After "measured", insert --in--

Column 2  Line 55  Delete "relevantart," and insert --relevant art,--

Column 2  Line 61  Delete "Mw/Mn," and insert --$M_w/M_n$,--

Column 2  Line 61  Delete "Mw" and insert --$M_w$--

Column 2  Line 62  Delete "Mn" and insert --$M_n$--

Column 2  Line 65  Delete "Mw/Mn" and insert --$M_w/M_n$--

Signed and Sealed this  
Tenth Day of September, 2019

Andrei Iancu  
*Director of the United States Patent and Trademark Office*

CERTIFICATE OF CORRECTION (continued)
U.S. Pat. No. 9,580,583 B2

| | | |
|---|---|---|
| Column 3 | Line 4 | Delete "an Mw" and insert --a $M_w$-- |
| Column 3 | Line 11 | Delete "an" and insert --a-- |
| Column 3 | Line 12 | Delete "an" and insert --a-- |
| Column 7 | Line 57 | Delete "(step a)" and insert --(step a))-- |
| Column 7 | Line 59 | Delete "(step b)." and insert --(step b)).-- |
| Column 9 | Line 39 | Delete "Mn, Mw and Mw/Mn" and insert --$M_n$, $M_w$ and $M_w/M_n$-- |
| Column 11 | Line 4 | Delete "Mw," and insert --$M_w$,-- |
| Column 11 | Line 26 | Delete "1949))" and insert --(1949))-- |
| Column 11 | Line 37 | Delete "spectroscpy" and insert --spectroscopy-- |
| Column 17 | Line 17 | Delete "Mw" and insert --$M_w$-- |
| Column 17 | Line 18 | Delete "Mz" and insert --$M_z$-- |
| Column 17 | Line 19 | Delete "Mw/Mn" and insert --$M_w/M_n$-- |

In the Claims

| | | |
|---|---|---|
| Column 17 | Line 48 | In Claim 1, delete "SIC Index=(($t_{onset,SIC}$@1000×$t_{onset,quiescent}$)/((HLMI)*100)" and insert --SIC Index=($t_{onset,SIC}$@1000×$t_{onset,quiescent}$)/((HLMI)*100)-- |
| Column 17 | Line 53 | In Claim 1, delete "$t_{onset,\ quiescent}$" and insert --$t_{onset,quiescent}$-- |
| Column 18 | Line 40 | In Claim 6, delete "Mw" and insert --$M_w$-- |
| Column 18 | Line 41 | In Claim 6, delete "Mw/Mn" and insert --$M_w/M_n$-- |